(12) United States Patent
Ishii et al.

(10) Patent No.: US 7,993,713 B2
(45) Date of Patent: Aug. 9, 2011

(54) HEAT SHRINKABLE MULTILAYER FILM AND PACKAGING MATERIAL USING THE SAME

(75) Inventors: Hitoshi Ishii, Omitama (JP); Seiichi Ibe, Omitama (JP); Tadayoshi Itoh, Omitama (JP); Shigeyoshi Nakaki, Omitama (JP)

(73) Assignee: Kureha Corporation, Tokyo (JP)

( * ) Notice: Subject to any disclaimer, the term of this patent is extended or adjusted under 35 U.S.C. 154(b) by 552 days.

(21) Appl. No.: 12/223,958

(22) PCT Filed: Jan. 15, 2007

(86) PCT No.: PCT/JP2007/050407
§ 371 (c)(1),
(2), (4) Date: Aug. 13, 2008

(87) PCT Pub. No.: WO2007/094144
PCT Pub. Date: Aug. 23, 2007

(65) Prior Publication Data
US 2009/0136726 A1 May 28, 2009

(30) Foreign Application Priority Data

Feb. 16, 2006 (JP) ................................ 2006-039434

(51) Int. Cl.
*B65B 53/00* (2006.01)
*F16B 4/00* (2006.01)
(52) U.S. Cl. ...................... 428/34.9; 428/35.2; 428/35.7; 428/36.9; 428/36.91; 428/474.4; 428/475.5; 428/475.8; 428/476.1
(58) Field of Classification Search .................. 428/34.9, 428/35.2, 35.7, 36.9, 36.91, 474.4, 475.5, 428/475.8, 476.1
See application file for complete search history.

(56) References Cited

U.S. PATENT DOCUMENTS

| 6,699,549 B1 | 3/2004 | Ueyama et al. |
| 2002/0061412 A1 | 5/2002 | Ueyama et al. |

FOREIGN PATENT DOCUMENTS

| AT | 258853 | 2/2004 |
| AT | 299435 | 7/2005 |
| CN | 1365886 | 8/2002 |
| CN | 1365886 A | 8/2002 |

(Continued)

OTHER PUBLICATIONS

International Search Report for PCT/JP2007/050407 dated Mar. 27, 2007.
Extended European Search Report from the European Patent Office dated Feb. 3, 2009.

(Continued)

*Primary Examiner* — Michael C Miggins
(74) *Attorney, Agent, or Firm* — Oliff & Berridge, PLC

(57) ABSTRACT

A heat shrinkable multilayer film comprising an outer surface layer (a) formed of a thermoplastic resin, a first intermediate layer (b1) formed of a polyamide resin, a second intermediate layer (b2) formed of a saponified product of an ethylene-vinyl acetate copolymer, and an inner surface layer (c) formed of a polyolefin resin, wherein
the shrink of the heat shrinkable multilayer film in water at 90° C. is within a range of from 3 to 45% in each of machine and transverse directions, and
the polyamide resin is a mixture of 60 to 90% by weight of an aliphatic polyamide having a melting point of 210° C. or higher and 10 to 40% by weight of an aromatic polyamide comprising isophthalic acid and terephthalic acid as main components.

11 Claims, 1 Drawing Sheet

FOREIGN PATENT DOCUMENTS

| | | |
|---|---|---|
| CN | 1300250 C | 7/2004 |
| DE | 699 26 125 T2 | 4/1999 |
| DE | 601 01 938 T2 | 9/2001 |
| DE | 699 26 125 T2 | 5/2006 |
| EP | 1 084 035 B1 | 4/1999 |
| EP | 1 190 847 B1 | 9/2001 |
| EP | 1190847 A1 | 9/2001 |
| JP | 61-188142 | 2/1985 |
| JP | 62-041261 | 8/1985 |
| JP | 11-300914 | 4/1998 |
| JP | 2001-354787 | 6/2000 |
| JP | 2002-172746 | 9/2001 |
| WO | WO 99/55528 | 4/1999 |

OTHER PUBLICATIONS

Keizo Miyasaka, "Encyclopedia of Plastic", $1^{st}$ Edition, Asakura Publishing Co., Ltd., $1^{st}$ printing Mar. 1, 1992, $2^{nd}$ printing Sep. 20, 1997, p. 408, lines 5-17.

Asahi Kasei Amidasu Kabushiki Kaisha Corporation, Editorial Department, "Plastics", Plastic Data Book, $1^{st}$ Edition, $1^{st}$ print, Dec. 1, 1999, p. 503, left upper figure.

Kazuo Soga, "Vision of a metallocene catalyst and a next-generation polymer", Trade edition, CMC Publishing Co., Ltd., Fukyuban, $1^{st}$ printing Dec. 25, 2001, p. 100, table 1.

Notification of Transmittal of Translation of the International Preliminary Report on Patentability dated Sep. 12, 2008.

HEAT SHRINKABLE MULTILAYER FILM AND PACKAGING MATERIAL USING THE SAME

TECHNICAL FIELD

The present invention relates to a heat shrinkable multilayer film useful as, for example, packaging materials for pouch, packaging materials for bag, packaging materials for pillow packaging, packaging materials for deep-draw packaging and lid materials for tray packaging.

BACKGROUND OF THE INVENTION

It has heretofore been widely conducted as packaging and processing techniques for food products such as meat, ham and sausage, and other products to form a heat shrinkable multilayer film into a bag or pouch by a bag making machine and then fill contents thereinto, or subject contents directly or contents placed on a tray to automatic packaging while forming a bag. A variety of characteristics or properties is required for such packaging films, and the films are required to be well balanced among various characteristics or properties, for example, heat shrinkability, strength, heat resistance, high-temperature creep resistance, moldability, suitability for various packages, gas barrier properties, water vapor barrier properties and transparency.

For example, Japanese Patent Application Laid-Open No. 2002-172746 (Document 1) discloses a heat shrinkable multilayer film comprising at least three layers of an outer surface layer (a) formed of a thermoplastic resin, an intermediate layer (b) formed of a polyamide resin and an inner surface layer (c) formed of a sealable resin as a film satisfying these various characteristics. The thermoplastic resin forming the outer surface layer (a) is a polyester resin or polyolefin resin. The polyamide resin forming the intermediate layer (b) is a mixture of 60 to 85% by weight of an aliphatic polyamide resin and 15 to 40% by weight of an aromatic copolymer polyamide resin that is a copolymer of aliphatic diamine/isophthalic acid and aliphatic diamine/terephthalic acid. The sealable resin forming the inner surface layer (c) is essentially a copolymer having a density of less than 0.915 and composed of ethylene and an α-olefin. The heat shrinkable multilayer film is heat-treated after biaxial stretching treatment, and the shrink of the heat shrinkable multilayer film in water at 80° C. is 30% or higher in each of machine and transverse directions and 35% or higher in at least one direction of the machine and transverse directions. Document 1 describes a heat shrinkable multilayer film using a nylon 6-66 copolymer with a melting point of about 195° C. as the above aliphatic polyamide resin.

However, the heat shrinkable multilayer film described in Document 1 is still insufficient in heat resistance and high-temperature creep resistance though the film is sufficient in heat shrinkability, tensile strength, moldability, suitability for various packages, gas barrier properties, water vapor barrier properties and optical property.

DISCLOSURE OF THE INVENTION

The present invention has been made in view of the problems involved in the prior art. It is an object of the present invention to provide a heat shrinkable multilayer film that highly satisfies various properties such as heat shrinkability, strength, heat resistance, high-temperature creep resistance, moldability, suitability for various packages, gas barrier property, water vapor barrier property and optical property, and is excellent in heat resistance and high-temperature creep resistance in particular.

The present inventors have carried out an extensive investigation with a view toward achieving the above-described object. As a result, it has been found that a combination of an outer surface layer (a) formed of a thermoplastic resin, a first intermediate layer (b1) formed of a polyimide resin having an extremely limited composition, a second intermediate layer (b2) formed of a thermoplastic resin having a specific composition, and an inner surface layer (c) formed of a polyolefin resin provides a heat shrinkable multilayer film that highly satisfies various properties such as heat shrinkability, tensile strength, heat resistance, moldability, suitability for various packages, gas barrier property, water vapor barrier property and optical property, and is excellent in heat resistance and high-temperature creep resistance in particular, thus leading to completion of the present invention.

A heat shrinkable multilayer film according to the present invention is a heat shrinkable multilayer film comprising an outer surface layer (a) formed of a thermoplastic resin, a first intermediate layer (b1) formed of a polyamide resin, a second intermediate layer (b2) formed of a saponified product of an ethylene-vinyl acetate copolymer, and an inner surface layer (c) formed of a polyolefin resin, wherein the shrink of the heat shrinkable multilayer film in water at 90° C. is within a range of from 3 to 45% in each of machine and transverse directions, and the polyamide resin is a mixture of 60 to 90% by weight of an aliphatic polyamide having a melting point of 210° C. or higher and 10 to 40% by weight of an aromatic polyamide comprising isophthalic acid and terephthalic acid as acid components.

In the heat shrinkable multilayer film according to the present invention, the aliphatic polyamide may preferably be at least one polymer selected from the group consisting of nylon 6 and nylon 66.

In the heat shrinkable multilayer film according to the present invention, the saponified product of the ethylene-vinyl acetate copolymer may preferably have an ethylene content ranging from 25 to 48 mol % and a saponification degree of 98% or higher.

In the heat shrinkable multilayer film according to the present invention, the polyolefin resin may preferably be at least one polymer selected from the group consisting of homopolymers of ethylene, homopolymers of propylene and linear copolymers of α-olefins having 2 to 8 carbon atoms.

In the heat shrinkable multilayer film according to the present invention, the thermoplastic resin may preferably be a polyester resin.

The heat shrinkable multilayer film according to the present invention may preferably be obtained by stretching a multilayer film comprising the outer surface layer (a), the first intermediate layer (b1), the second intermediate layer (b2) and the inner surface layer (c) at a draw ratio of from 2.5 to 4 times in each of machine and transverse directions and then subjecting the stretched film to a heat relaxation treatment so as to give a relaxation ratio of from 2 to 40%.

A packaging material for pouch according to the present invention comprises the heat shrinkable multilayer film described above.

A packaging material for bag according to the present invention comprises the heat shrinkable multilayer film described above.

A packaging material for pillow packaging according to the present invention comprises the heat shrinkable multilayer film described above.

A packaging material deep-draw packaging according to the present invention comprises the heat shrinkable multilayer film described above.

A lid material for tray packaging according to the present invention comprises the heat shrinkable multilayer film described above.

According to the present invention, there can be provided a heat shrinkable multilayer film that highly satisfies various properties such as heat shrinkability, strength, heat resistance, high-temperature creep resistance, moldability, suitability for various packages, gas barrier property, water vapor barrier property and optical property. The heat shrinkable multilayer film is excellent in heat resistance and high-temperature creep resistance in particular.

DETAILED DESCRIPTION OF THE PREFERRED EMBODIMENTS

Figure 1:
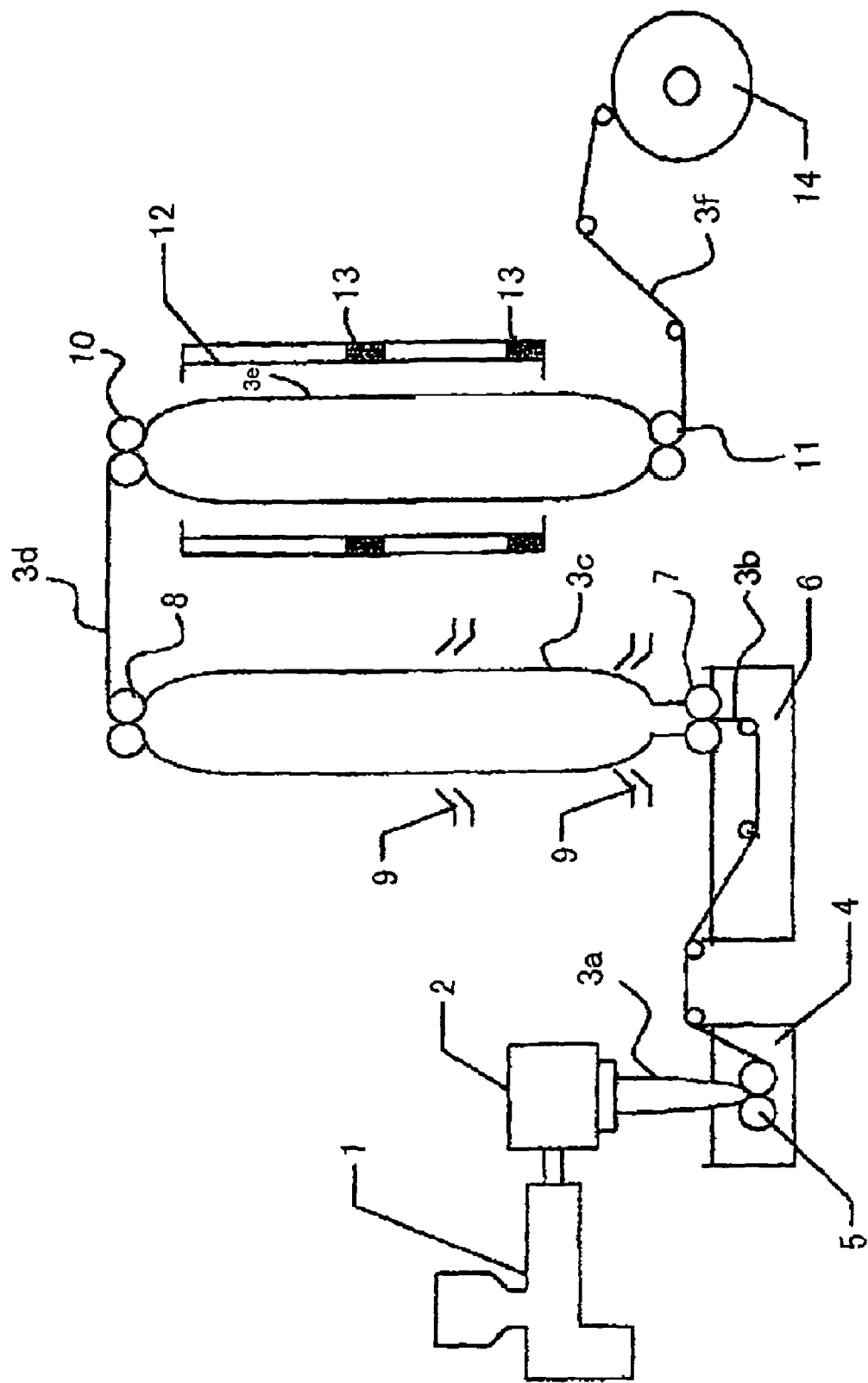
FIG. 1 typically illustrates an apparatus suitable for use in production of a heat shrinkable multilayer film according to the present invention.

Hereinafter, the present invention will be described in detail by way of its suitable embodiments.

First, the heat shrinkable multilayer film according to the present invention will be described. The heat shrinkable multilayer film according to the present invention is a heat shrinkable multilayer film comprising an outer surface layer (a) formed of a thermoplastic resin described below, a first intermediate layer (b1) formed of a polyimide resin described below, a second intermediate layer (b2) formed of a saponified product of an ethylene-vinyl acetate copolymer described below and an inner surface layer (c) formed of a polyolefin resin described below.

The shrink of the shrinkable multilayer film in water at a temperature of 90° C. is within a range of from 3 to 45% in each of machine and transverse directions.

The polyamide resin described below is a mixture of 60 to 90% by weight of an aliphatic polyamide with a melting point of 210° C. or higher and 10 to 40% by weight of an aromatic polyamide mainly comprising isophthalic acid and terephthalic acid as main components.

(Outer Surface Layer)

As the thermoplastic resin forming the outer surface layer (a) in the present invention, is preferably used a resin that has suitable stretchability in a laminated state with the first intermediate layer (b1) formed of a polyamide resin described below and prevents the permeation of water into the first intermediate layer (b1). The use of such a thermoplastic resin can prevent the permeation of water into the first intermediate layer (b1) formed of a polyamide resin easily absorbing water and can restrain the problem that the strength of the resulting multilayer film is deteriorated by water freezing when the film is frozen or refrigerated. Examples of such a thermoplastic resin include polyester resins and polyolefin resins.

Examples of such polyolefin ("PO") include homopolymers of ethylene, homopolymers of propylene, linear copolymers of α-olefins having 2 to 8 carbon atoms, such as VLDPE (linear very low density polyethylene) and LLDPE (linear low density polyethylene), and polyolefin copolymers such as propylene-ethylene copolymers, propylene-ethylene-butene-1 copolymers, EVA (ethylene-vinyl acetate copolymers), EAA (ethylene-acrylic acid copolymers), EMAA (ethylene-methacrylic acid copolymers), EMA (ethylene-methyl acrylate copolymers), EEA (ethylene-ethyl acrylate copolymers) and EBA (ethylene-butyl acrylate copolymers). These polyolefin resins may be used either singly or in any combination of two or more resins thereof. Examples of a catalyst used for polymerizing these polyolefin resins include well-known conventional catalysts (Ziegler-Natta catalysts) and single site catalysts (metallocene catalysts).

In the heat shrinkable multilayer film according to the present invention, the thermoplastic resin is preferably a polyester resin from the viewpoints of transparency, heat resistance, surface gloss, film strength, mechanical suitability and moldability.

Example of such a polyester resin include aliphatic polyester resins and aromatic polyester resins. The polyester resin can be obtained by, for example, polycondensing a dicarboxylic acid component and a diol component.

No particular limitation is imposed on the dicarboxylic acid component so far as it can provide polyester by a usual production process, and examples thereof include terephthalic acid, isophthalic acid, adipic acid, oxalic acid, malonic acid, succinic acid, azelaic acid, sebacic acid, phthalic acid, 5-t-butylisophthalic acid, naphthalene dicarboxylic acid, diphenyl ether dicarboxylic acid, cyclohexanedicarboxylic acid, and dimer acids composed of dimmers of unsaturated aliphatic acids. These dicarboxylic acid components may be used either singly or in any combination thereof.

No particular limitation is imposed on the diol component so far as it can provide polyester by a usual production process, and examples thereof include ethylene glycol, propylene glycol, tetramethylene glycol, neopentyl glycol, hexamethylene glycol, diethylene glycol, polyalkylene glycol, 1,4-cyclohexane dimethanol and 2-alkyl-1,3-propanediol. These diol components may be used either singly or in any combination thereof.

Among the polyester resins, aromatic polyester resins containing an aromatic dicarboxylic acid component are preferred from the viewpoints of moldability and film-forming ability. Aromatic polyester resins (for example, polyethylene terephthalate and polybutylene terephthalate) obtained by using at least one acid selected from the group consisting of terephthalic acid and isophthalic acid as a dicarboxylic acid component and using a diol having at most 10 carbon atoms as a diol component are more preferred, with aromatic polyester resins (for example, trademark "Bellpet IFG-8L", product of Bell Polyester Products, Inc.) obtained by using terephthalic acid and isophthalic acid as dicarboxylic acid components and using ethylene glycol as a diol component being particularly preferred. These polyester resins may be used either singly or in any combination thereof. As these polyester resins, are preferably used resins having a limiting viscosity of about 0.6 to 1.2.

The thickness of the outer surface layer (a) in the present invention is preferably within a range of from 0.5 to 20 μm, more preferably from 1 to 5 μm.

When the thermoplastic resin forming the outer surface layer (a) is a polyester resin, the thickness of the outer surface layer (a) is preferably smaller than the thickness of the first intermediate layer (b1) described below in order to adjust biaxial stretchability of the resulting film, and the thickness of the outer surface layer (a) is more preferably within a range of from 3 to 70% of the thickness of the first intermediate layer (b1) described below, particularly preferably within a range of from 6 to 30%.

In the present invention, the outer surface layer (a) may contain other thermoplastic resins than the polyester resin, for example, thermoplastic elastomers represented by thermoplastic polyurethane and polyolefin resins modified by an acid such as maleic acid or its anhydride, in an amount of at most 20% by weight.

(First Intermediate Layer)

The polyamide resin ("PA") forming the first intermediate layer (b1) in the present invention requires to be a mixture of 60 to 90% by weight of a specific aliphatic polyamide and 10 to 40% by weight of an aromatic polyamide comprising isophthalic acid and terephthalic acid as acid components. If the amount of the aromatic polyamide is less than 10% by weight, the resulting multilayer film cannot achieve a high shrink in hot water. If the amount of the aromatic polyamide exceeds 40% by weight on the other hand, the extrusion processability and stretchability of the resulting multilayer film become poor. If the amount of the aromatic polyamide exceeds 406 by weight, for example, the resulting heat shrinkable multilayer film becomes brittle, and thus breakage upon blown-film extrusion or tearing by clipping upon T-die extrusion is liable to occur, thereby reducing productivity.

No particular limitation is imposed on the aromatic polyamide. As examples thereof, however, may be mentioned copolymers obtained from an acid component composed of 40 to 98 mol % of an isophthalic acid component and 2 to 60 mol % of a terephthalic acid component, and aliphatic diamine composed of 50 to 100 mol % of hexamethylenediamine and 0 to 50 mol % of bis(p-aminocyclohexyl)methane. Such an aromatic polyamide is normally non-crystalline, and its crystallinity is very little if any, and so the melting point thereof is unclear.

In the present invention, the aliphatic polyamide requires to have a melting point of 210° C. or higher. The melting point of the aliphatic polyamide is preferably 215° C. or higher, more preferably 220° C. or higher. If the melting point of the aliphatic polyamide is lower than 210° C., a heat shrinkable multilayer film excellent in heat resistance and high-temperature creep resistance cannot be obtained.

Examples of the aliphatic polyamides having a melting point of 210° C. or higher include nylon 6, nylon 66 and nylon 610. Among these polyamides, nylon 6 and nylon 66 are preferred from the viewpoints of film-forming ability, forming and processing ability, heat resistance and creep resistance, and nylon 6 is particularly preferred. These aliphatic polyamides may be used either singly or in any combination thereof.

When the mixture obtained by blending the aliphatic polyamide having a melting point of 210° C. or higher and the aromatic polyamide in a specified ratio is used as the polyamide resin as described above, a heat shrinkable multilayer film that is excelling in heat resistance and high-temperature creep resistance and highly satisfies various properties required for packaging films can be stably obtained. When a mixture of an aliphatic polyamide having a melting point lower than 210° C. and the above-described aromatic polyamide is used as the polyamide resin on the other hand, the desired heat resistance and high-temperature creep resistance cannot be achieved. In this case, for example, even if the proportion of the aromatic polyamide is increased, the heat resistance of the resulting film becomes poor because of its non-crystallinity, and the disadvantage of giving an adverse influence even on film forming ability is also caused. In this case, even if a polyamide having a high softening point as compared with the aromatic polyamide is used, the film forming ability is worsened, or the desired heat resistance and high-temperature creep resistance cannot be achieved.

The thickness of the first intermediate layer (b1) in the present invention is preferably within a range of from 3 to 35 μm, more preferably from 4 to 25 μm. If the thickness of the first intermediate layer (b1) is less than the above lower limit, the resulting film tends to deteriorate heat resistance and resistance to pinhole. If the thickness exceeds the above upper limit on the other hand, such layer tends to deteriorate film forming ability.

(Second Intermediate Layer)

As the saponified product ("EVOH") of the ethylene-vinyl acetate copolymer forming the second intermediate layer (b2) in the present invention, a substance having appropriate gas barrier properties is preferably used. The saponified product of the ethylene-vinyl acetate copolymer preferably has an ethylene content ranging from 25 to 48 mol % and a saponification degree of 98% or higher. If the ethylene content of the saponified product of the ethylene-vinyl acetate copolymer is lower than 25 mol %, there is a tendency to produce insoluble matter. If the ethylene content exceeds 48 mol % on the other hand, the resulting film tends to deteriorate oxygen gas barrier property. If the saponification degree of the saponified product of the ethylene-vinyl acetate copolymer is lower than 98%, the resulting film tends to deteriorate oxygen gas barrier property.

The thickness of the second intermediate layer (b2) in the present invention is preferably within a range of from 1 to 30 μm, more preferably from 2 to 15 μm. If the thickness of the second intermediate layer (b2) is less than the above lower limit, the resulting film tends not to achieve sufficient oxygen gas barrier property. If the thickness exceeds the above upper limit on the other hand, the resulting film tends to become difficult to be subject to stretching.

(Inner Surface Layer)

As the polyolefin resin ("PO") forming the inner surface layer (c) in the present invention, a resin having proper seal strength in the temperature range of from 90 to 250° C. is preferably used. As examples of such a polyolefin resins ("PO"), may be mentioned the same resins as the polyolefin resins exemplified as the component forming the above-described outer surface layer (a). Among these polyolefin resins, homopolymers of ethylene, homopolymers of propylene and linear copolymers of α-olefins having 2 to 8 carbon atoms, such as VLDPE (linear very low density polyethylene) and LLDPE (linear low density polyethylene) are preferred from the viewpoints of water vapor barrier property and sealability, and VLDPE and LLDPE are more preferred.

The thickness of the inner surface layer (c) in the present invention is preferably within a range of from 10 to 80 μm, more preferably from 12 to 55 μm. If the thickness of the inner surface layer (c) is less than the above lower limit, the resulting film tends to have insufficient water vapor barrier property and seal strength. If the thickness exceeds the above upper limit on the other hand, the resulting film tends to deteriorate transparency.

(Other Intermediate Layers)

In the heat shrinkable multilayer film according to the present invention, adhesive resin layers may be provided as other intermediate layers as needed when interlayer adhesion force between the respective layers is insufficient. As adhesive resins forming other intermediate layers, oxygen-containing olefin (co)polymers can be used. Examples of the oxygen-containing olefin (co)polymers include EVA, EEA, EAA and acid-modified polyolefins. The acid-modified polyolefin is a reaction product of a homopolymer or copolymer of an olefin with an unsaturated carboxylic acid, acid anhydride, ester, metal salt or the like, and specific examples thereof include acid-modified VLDPE, acid-modified LLDPE and acid-modified EVA. Among these adhesive resins, olefin resins modified by an unsaturated carboxylic acid such as maleic acid, or an anhydride thereof are preferred. The thicknesses of these other intermediate layers is preferably within a range of from 0.5 to 5 μm.

(Heat Shrinkable Multilayer Film)

The heat shrinkable multilayer film according to the present invention is a heat shrinkable multilayer film comprising the above-described outer surface layer (a), first intermediate layer (b1), second intermediate layer (b2) and inner surface layer (c).

The heat shrinkable multilayer film according to the present invention requires shrinking in water at 90° C. within a range of from 3 to 45% in each of machine and transverse directions. If the shrink in hot water is less than 3%, the shrinkage of a packaging film located on the surface of a package becomes insufficient, and so the package is wrinkled, or the adhesion to contents becomes insufficient when the package, into which contents have been filled, is heated by hot water, steam, dry heating or the like. If the shrink in hot water exceeds 45% on the other hand, a sealed part is distorted in a gathered shape upon pouch packaging, during which bag bottoming or three-side sealing is conducted, so that appearance is worsened, and bag stacking conditions are worsened when bags are stacked in a box, resulting in difficulty in working. Furthermore, when the bag is filled with contents and heat-shrunken in this case, the sealed part is liable to be broken. The shrink in hot water is a value measured by a method described in Examples to be described below.

The heat shrinkable multilayer film according to the present invention preferably has an oxygen transmission rate of 100 $cm^3/m^2 \cdot day \cdot atm$ or lower at a temperature of 23° C. and a relative humidity of 80%. If the oxygen transmission rate exceeds 100 $cm^3/m^2 \cdot day \cdot atm$, deterioration of contents by oxidation cannot be prevented, and so the package tends to deteriorate shelf stability.

The heat shrinkable multilayer film of the present invention preferably has a water vapor transmission rate (WVTR) of 25 $g/m^2 \cdot day$ or lower, more preferably 20 $g/m^2 \cdot day$ or lower at a temperature of 40° C. and a relative humidity of 90%. If the water vapor transmission rate exceeds the above upper limit, a package filled with contents tends to be unable to prevent loss in weight.

In the heat shrinkable multilayer film according to the present invention, a lubricant and an antistatic agent may be added to any layer of the above-described layers. Examples of the lubricant include behenic acid amide, oleic acid amide and erucic acid amide. The lubricant is preferably added to a resin forming any layer in a proportion of 0.05 to 2% by weight. Examples of the antistatic agents include commercially available surfactants. The antistatic agent is preferably added to a resin forming any layer in a proportion of 0.05 to 2% by weight, more preferably 0.1 to 1% by weight.

In the heat shrinkable multilayer film according to the present invention, the above mentioned other intermediate layers may be further arranged in addition to the above-described outer surface layer (a), first intermediate layer (b1), second intermediate layer (b2) and inner surface layer (c). Here, examples of a lamination form of the heat shrinkable multilayer film of the present invention are illustrated. However, these are only illustrations, and the present invention is by no means limited to only these forms.

(1): outer surface layer (a)/adhesive resin layer/first intermediate layer (b1)/second intermediate layer (b2)/adhesive resin layer/inner surface layer (c); and (2): outer surface layer (a)/adhesive resin layer/first intermediate layer (b1)/second intermediate layer (b2)/first intermediate layer (b1)/adhesive resin layer/inner surface layer (c).

An (oxygen-containing) polyolefin (copolymer) layer may also be further arranged between the adhesive resin layer and the inner surface layer (c) for improving sealability.

The heat shrinkable multilayer film according to the present invention is produced by laminating the respective layers and then stretching them as described below. The thickness of such a heat shrinkable multilayer film is preferably within a range of from 12 to 170 μm, more preferably from 20 to 150 μm.

The heat shrinkable multilayer film can be suitably used as packaging materials for pouch, packaging materials for bag, packaging materials for pillow packaging, packaging materials for deep-draw packaging and lid materials for tray packaging.

(Process for Producing Heat Shrinkable Multilayer Film)

A process for producing the heat shrinkable multilayer film of the present invention will now be described. The heat shrinkable multilayer film according to the present invention can be produced by first co-extruding an unstretched film by means of a plurality of extruders, biaxially stretching the resultant film by a publicly known method such as a tenter method, and then subjecting the stretched film to a heat relaxation treatment.

The heat shrinkable multilayer film according to the present invention is more preferably produced by a blown-film extrusion method. An apparatus suitable for producing the heat shrinkable multilayer film according to the present invention and a process suitable for producing the heat shrinkable multilayer film of the present invention will hereinafter be described with reference to a drawing.

FIG. 1 typically illustrates an apparatus suitable for use in production of the heat shrinkable multilayer film according to the present invention. In the apparatus shown in FIG. 1, a tubular body (parison) 3a including an outer surface layer (a) formed of a thermoplastic resin, a first intermediate layer (b1) formed of a polyamide resin, a second intermediate layer (b2) formed of a saponified product of an ethylene-vinyl acetate copolymer and an inner surface layer (c) formed of a polyolefin resin is first co-extruded through a circular die 2 by means of extruders 1 (showing only one unit) according to the number of laminated resin species making up a multilayer film. The molten tubular body 3a immediately after the coextrusion is then taken off by pinch rollers 5 while cooling the tubular body by a water bath 4 to a melting point or lower of a resin primarily occupied in each layer, preferably to 20° C. or lower, more preferably to 15° C. or lower. The film-shaped tubular body 3b (multilayer film) taken off is then introduced into a warm water bath 6 at a temperature (for example, 80 to 95° C.) of a melting point or lower of a resin primarily occupied in each layer while internally introducing an opening aid represented by soybean oil, fatty acid ester of glycerin, propylene glycol or the like as needed, and the heated film-shaped tubular body 3b is drawn upward. The film-shaped tubular body 3b is formed into a bubble shape with fluid air introduced between pairs of pinch rollers 7 and 8 to form a blown tubular film 3c, and the blown film is simultaneously biaxially stretched preferably at 2.5 to 4 times, more preferably from 2.5 to 3.5 times, particularly preferably at 2.5 to 3.3 times in a mechanical direction (MD) and a transverse direction (TD) while cooling the film by an air ring 9 of cold air at 10 to 20° C. The tubular film 3d after the stretching is then drawn downward and formed into a bubble shape again with fluid air introduced between pairs of pinch rollers 10 and 11 to form a tubular film 3e to be subjected to heat treatment, which is held in a heat treating column 12. Steam is sprayed alone or together with air against the tubular film 3e to be subjected to heat treatment from blow-off openings 13 of the heat treating column 12, thereby heat-treating the film preferably at 50 to 100° C., more preferably at 60 to 95° C. for about 1 to 20 seconds, preferably for about 1.5 to 10 seconds. The tubular film 3e subjected to the heat treatment is then relaxed in a mechanical direction (MD) and a transverse direction (TD) in such a manner that the relaxation ratio reaches 2 to 40%, preferably 5 to 30%. A tubular film 3f after the heat relaxation treatment corresponds to the heat shrinkable multilayer film according to the present invention and is taken up on a take-up roller 14.

In the present invention, the draw ratio is preferably within the above range in each of the MD and TD directions from the viewpoint of realizing improvement in various properties required of a packaging film. If the draw ratio is less than the above lower limit, the heat shrinkability of a film required after the heat treatment is not achieved. In addition, the thickness deviation of the film also becomes large and thus the film tends not to achieve suitability for packaging.

In the present invention, the heat relaxation treatment is carried out for providing a heat shrinkable multilayer film that is excellent in appearance after the stretching, i.e., so excellent in dimensional stability that occurrence of wrinkles by slight dimension change is inhibited and suitable for secondary processability such as suitability for automatic packaging machine and bag production processing. The heat shrinkable multilayer film according to the present invention can be more surely obtained by conducting the heat relaxation treatment after the stretching as described above.

The heat shrinkable multilayer film of the present invention produced by such a process as described above is used in, for example, chilled packaging for raw meat such as beef and pork, pillow packaging (flow pack packaging), processed meat packaging, packaging for strongly smoked food represented by hard bacon, cheese packaging, packaging for food in a ceramic jar such as terrine, packaging for food with protrusions such as meats with bones, shrimps and crabs, packaging for fish and shellfish, freeze packaging for raw meat, poultry such as pork, and fish. The heat shrinkable multilayer film according to the present invention is particularly used in fields of packaging materials of which heat resistance and high-temperature creep resistance are required in the case where ham or sausage is hung to cook it.

In the process for producing the heat shrinkable multilayer film according to the present invention, the tubular body 3a may also be irradiated with radiation by a publicly known method before or after the tubular body 3a is stretched. The irradiation with radiation makes it possible to improve stretchability, heat resistance, mechanical strength and the like of the resulting film as compared with a film irradiated with no radiation. The irradiation with radiation has an effect of providing a film excellent in stretched film-forming ability and heat resistance by its moderate crosslinking effect. In the present invention, irradiation with electron rays is particularly preferred and advantageous from the viewpoints of handling properties and high processing ability upon production of a formed product. Irradiation conditions of radiation may be suitably preset as necessary for the end application intended and are not particularly limited. However, in the case of irradiation of, for example, electron rays, it is preferred that an acceleration voltage is within a range of from 150 to 500 kilovolts, and an exposure dose is within a range of from 10 to 200 kilograys (kGy).

the inner surface and/or outer surface of the heat shrinkable multilayer film according to the present invention may also be subjected to corona discharge treatment, plasma treatment and flame treatment. In particular, the inner surface is preferably subjected to corona discharge treatment for imparting adhesion to meat. In order to impart the adhesion to meat, the wetting tension of a surface layer coming into contact with a product to be packaged is adjusted to preferably 32 dyn/cm or higher, more preferably 34 dyn/cm or higher.

EXAMPLES

Hereinafter, the present invention will hereinafter be described more specifically on the basis of Examples and Comparative Examples. However, the present invention is not limited to the following examples. Resins used in Examples and Comparative Examples are shown collectively in the following Table 1 together with their abbreviated names. The compositions of polyamide resins used in Examples and Comparative Examples are shown collectively in the following Table 2 together with their abbreviated names. Conditions for production of heat shrinkable multilayer films in Examples and Comparative Examples are shown collectively in the following Table 3.

TABLE 1

| Abbreviated name | Resin name | Maker and grade | Crystal melting point | Notes |
|---|---|---|---|---|
| Ny6 | Nylon 6 polymer | Ube Industries, Ltd. Ubenylon #1030B | 220° C. | |
| Ny6-66 | Nylon 6-66 copolymer Copolymerization ratio: 80/20% by weight | Toray industries, Inc. Amilan CM6241FS | 190° C. | |
| Ny6I6T | (Condensation) copolymer of isophthalic acid, terephthalic acid and hexamethylenediamine | AMS Chemie Japan Co., Ltd. Grivory G21 | — | Non-crystalline |
| PET | Ethylene terephthalate/ isophthalate copolymer In the acid component of copolyester, terephthalic acid content: 88 mol %, isophthalic acid content: 12 mol % | Bell Polyester Products, Inc. Bellpet IFG-8L | 228° C. | |
| EVOH | Saponified product of ethylene/vinyl acetate copolymer Ethylene content: 47 mol % | Kuraray Co., Ltd. Eval EPG-156B | 160° C. | |
| M-PE | Very low density polyethylene modified by unsaturated carboxylic acid | Mitsui Chemicals, Inc. Admar SF730 | 119° C. | |
| VLDPE | Very low density ethylene polymer Density: 0.904 g/cm$^3$ | Dow Chemicals, Inc. Attain #SC4107 | 119° C. | |

TABLE 2

| Abbreviated name | Resin composition |
|---|---|
| Ny-1 | Ny6 + Ny6I6T = 85 + 15 wt. % |
| Ny-2 | Ny6 + Ny6I6T = 80 + 20 wt. % |
| Ny-3 | Ny6 + Ny6I6T = 75 + 25 wt. % |
| Ny-4 | Ny6 + Ny6I6T = 70 + 30 wt. % |
| Ny-5 | Ny6 + Ny6I6T = 65 + 35 wt. % |
| Ny-A | Ny6-66 + Ny6I6T = 80 + 20 wt. % |
| Ny-B | Ny6 + Ny6I6T = 95 + 5 wt. % |
| Ny-C | Ny6 + Ny6I6T = 40 + 60 wt. % |

TABLE 3

| | Resin composition and thickness (μm) of each layer | | | | | | Total thickness (μm) | Film-forming conditions | | Heat treatment conditions | |
|---|---|---|---|---|---|---|---|---|---|---|---|
| | 1st layer | 2nd layer | 3rd layer | 4th layer | 5th layer | 6th layer | | Heating temp. (° C.) | Draw ratio MD/TD | Heating temp. (° C.) | Relaxation ratio MD/TD |
| Ex. 1 | PET (1) | M-PE (1) | Ny-1 (7) | EVOH (4) | M-PE (1) | VLDPE (16) | 30 | 87 | 2.7/3.1 | 68 | 10/15 |
| Ex. 2 | PET (1) | M-PE (1) | Ny-2 (7) | EVOH (4) | M-PE (1) | VLDPE (16) | 30 | 87 | 2.7/3.1 | 65 | 10/15 |
| Ex. 3 | PET (1) | M-PE (1) | Ny-3 (7) | EVOH (4) | M-PE (1) | VLDPE (16) | 30 | 87 | 2.8/3.1 | 65 | 10/15 |
| Ex. 4 | PET (1) | M-PE (1) | Ny-4 (7) | EVOH (4) | M-PE (1) | VLDPE (16) | 30 | 87 | 2.8/3.0 | 65 | 10/15 |
| Ex. 5 | PET (1) | M-PE (1) | Ny-5 (7) | EVOH (4) | M-PE (1) | VLDPE (16) | 30 | 87 | 2.8/3.0 | 65 | 10/15 |
| Comp. Ex. 1 | PET (1) | M-PE (1) | Ny6 (7) | EVOH (4) | M-PE (1) | VLDPE (16) | 30 | 87 | (2.8/3.0) Unstretchable | 65 | (10/15) Unstretchable |
| Comp. Ex. 2 | PET (1) | M-PE (1) | Ny-B (7) | EVOH (4) | M-PE (1) | VLDPE (16) | 30 | 87 | (2.8/3.0) Unstretchable | 65 | (10/15) Unstretchable |
| Comp. Ex. 3 | PET (1) | M-PE (1) | Ny-C (7) | EVOH (4) | M-PE (1) | VLDPE (16) | 30 | 87 | (2.8/3.0) Unstretchable | 65 | (10/15) Unstretchable |
| Exs. 6 to 8 | PET (2) | M-PE (1.5) | Ny-4 (11) | EVOH (4) | M-PE (1.5) | VLDPE (19) | 39 | 87 | 2.8/3.0 | 65 | 10/5 |
| Comp. Exs. 4 and 6 | PET (2) | M-PE (1.5) | Ny-4 (11) | EVOH (4) | M-PE (1.5) | VLDPE (20) | 40 | Not stretched | Not stretched | Not heat-treated | Not heat-treated |
| Comp. Ex. 5 | PET (2) | M-PE (1.5) | Ny-4 (11) | EVOH (4) | M-PE (1.5) | VLDPE (19) | 39 | 87 | 2.8/3.0 | Not heat-treated | Not heat-treated |
| Ex. 9 | PET (1) | M-PE (1.5) | Ny-4 (25) | EVOH (3) | M-PE (1.5) | VLDPE (8) | 40 | 78 | 2.6/3.1 | 80 | 5/7 |
| Comp. Ex. 7 | PET (1) | M-PE (1.5) | Ny-A (25) | EVOH (3) | M-PE (1.5) | VLDPE (8) | 40 | 78 | 2.6/3.1 | 80 | 5/7 |
| Ex. 10 | PET (3) | M-PE (3) | Ny-4 (23) | EVOH (4) | M-PE (3) | VLDPE (54) | 90 | 87 | 2.7/3.0 | 87 | 20/20 |
| Comp. Ex. 8 | PET (3) | M-PE (3) | Ny-4 (23) | EVOH (4) | M-PE (3) | VLDPE (54) | 90 | 87 | 2.7/3.0 | Not heat-treated | Not heat-treated |
| Comp. Ex. 9 | PET (3) | M-PE (3) | Ny-4 (23) | EVOH (4) | M-PE (3) | VLDPE (54) | 90 | Not stretched | Not stretched | Not heat-treated | Not heat-treated |
| Ex. 11 | PET (2) | M-PE (1) | Ny-4 (9) | EVOH (3) | M-PE (1) | VLDPE (11) | 27 | 87 | 2.8/3.1 | 65 | 5/12.5 |

Example 1

First, the respective resins were separately extruded by a plurality of extruders 1 using the apparatus shown in FIG. 1 in such a manner that the lamination form is PET (1)/M-PE (1)/Ny–1 (7)/EVOH (4)/M-PE (1)/VLDPE (16) in order from outside to inside at a thickness ratio indicated in parentheses, and the molten resins were introduced into a circular die 2, where the resins were melt-bonded so as to give the above-described layer structure and co-extruded. The molten tubular body 3a flowed out of an exit of the circular die 2 was taken off by pinch rollers 5 in the form of a film while being quenched in a water bath 4 to about 16° C. The film-shaped tubular body 3b was then passed through a warm water bath 6 at 87° C. and then was formed into a bubble-shaped inflating tubular film 3c and simultaneously biaxially stretched in a mechanical direction (MD) at a draw ratio of 2.7 times and in a transverse direction (TD) at a draw ratio of 3.1 times by a blown-film extrusion method while cooling by an air ring 9 controlled to 15 to 20° C. The tubular film 3d after the stretching was then introduced into a heat treatment column 12 having a column length of 2 m to provide a bubble-shaped tubular film 3e being subjected to heat treatment, which was heated to 68° C. with stream blown from blow-off openings 13 and heat treated for 2 seconds while relaxing at 10% in a machine direction and at 15% in a transverse direction, thereby producing a heat-treated tubular film 3f (heat shrinkable multilayer film). The thickness of the heat shrinkable multilayer film thus obtained was 30 μm.

Examples 2 to 5 and Comparative Examples 1 to 3

Heat-treated tubular films 3f (heat shrinkable multilayer films) were obtained in the same manner as in Example 1 except that the conditions for production of films were respectively changed as described in Table 3. The thicknesses of the heat shrinkable multilayer films (Examples 2 to 5) thus obtained were 30 μm. Under the production conditions of the films of Comparative Examples 1 and 3, tubular films 3f (heat shrinkable multilayer films) were not obtained since breaking of bubbles was caused during blow-stretching. Under the production conditions of the film of Comparative Example 2, a tubular film 3f (heat shrinkable multilayer film) was not obtained since a bubble of the film was pulsated and became unstable during blow-stretching.

<Evaluation of Heat Shrinkable Multilayer Film on Various Properties>

(1) Evaluation Method

Various properties of heat shrinkable multilayer films were evaluated or determined by the following methods.

(1) Shrink in Hot Water

After a film sample marked at 10 cm intervals in a machine direction (longitudinal direction, MD) and in a direction (transverse direction, TD) perpendicular to the machine direction of the resultant heat shrinkable multilayer film was immersed for 10 seconds in hot water controlled at 90° C., the film was taken out and immediately cooled with water at ordinary temperature. Thereafter, a length between the marked intervals was measured, and a proportion of a decreased value from the original length of 10 cm to the original length was expressed by percentage. The test was carried out 5 times for each sample, and an average value in each of the machine and transverse directions was indicated as a shrink in hot water.

(2) Dry-Heat Shrink

A gear oven (MOG 600 Model, manufactured by Robert & Co., Ltd.), in which a cardboard having a thickness of 3 mm was placed on a net rack, was heated to a temperature of 120° C., and a film sample marked at 10 cm intervals in a machine direction (longitudinal direction, MD) and in a direction (transverse direction, TD) perpendicular to the machine direction of the resultant heat shrinkable multilayer film was placed in the gear oven. At this time, the door of the gear oven was closed immediately after the film sample was placed. The time while the door was open was within 3 seconds. After the door was closed, and the sample for measurement was left to stand for 30 seconds in the gear oven, the sample was taken out and air-cooled. Thereafter, a length between the marked intervals was measured, and a proportion of a decreased value from the original length of 10 cm to the original length was expressed by percentage. The test was carried out 5 times for each sample, and an average value in each of the machine and transverse directions was indicated as a dry-heat shrink.

(3) Transparency (Haze Value)

A cloudiness (haze: %) of a film sample was measured by means of a cloudiness meter, NDH-Σ80 manufactured by Nippon Denshoku Industries Co., Ltd as a measuring device according to the method described in JIS K-7105. The smaller the haze value, the better the transparency, while the larger the haze value, the worse the transparency.

(4) Tensile Strength at Break and Tensile Elongation at Break of Film

A strip-like film sample having a width of 10 mm and a length of 50 mm was stretched at a temperature of 23° C. at a crosshead speed of 200 mm/min using TENSILON RTC-1210 Model (manufactured by Orientec Corp.; trademark) as a measuring device to determine stress (tensile strength at break) and elongation (tensile elongation at break) when the film sample was broken.

(5) Impact Fracture Energy

The impact fracture energy of a film sample was determined by means of DROP-WEIGHT TESTER RDT-5000 (made by Rheometric Inc.; trademark) according to the method described in ASTM D3763-86. More specifically, a film sample cut into a square-shape of 10 cm×10 cm was held between two cramps each having an aperture circle with a diameter of 3.8 cm under an atmosphere of a temperature of 5° C., and a 4-kg weight having a semi-sphere edge part of a diameter of 1.27 cm was dropped on the film at the aperture circle part at a speed of 333.33 cm/sec to measure a load imposed on a plunger and displacement during dropping by means of a sensor, thereby obtaining a displacement-load curve. On the curve, energy ($E_{IP}$ (J)) required up to fracture was determined. The measurement was conducted 5 times on each sample regarding as a front surface when the film sample was set in such a manner that the outer surface layer of the film turns upward and as a back surface when the film sample was set in such a manner that the reverse side turns upward, and an average value thereof was calculated to determine energy ($E_{IP}$ (J)). Then, an average film thickness t of each sample was determined to calculate impact energy ($E_{IP50}$ (J)) when the film thickness was reduced to 50 μm from the resultant energy ($E_{IP}$(J)) value and average film thickness t value using the following equation (1):

$$E_{IP50}(J)=(E_{IP}(J))\times(50/t) \quad (1)$$

$E_{IP50}$: impact energy when the film thickness was reduced to 50 μm,
$E_{IP}$: energy required up to fracture
t: average film thickness,
to express this value as impact energy.

(6) Oxygen Transmission Rate

An oxygen transmission rate was determined according to the method described in ASTM D3985 under conditions of 23° C. in temperature and 80% in relative humidity (RH) using an oxygen transmission rate measuring instrument OX-TRAN (OX-TRAN 2/20, manufactured by Modern Controls Co.; trademark).

(7) Water Vapor Transmission Rate (WVTR)

An water vapor transmission rate was determined according to the method described in ASTM F1249-90 under conditions of 40° C. in temperature and 90% in RH using a water vapor transmission rate measuring instrument (PERMATRAN-W 3/31; manufactured by Modern Controls Co.; trademark)).

(II) Evaluation Results

With respect to the heat shrinkable multilayer films obtained in Examples 1 to 5, various properties of the heat shrinkable multilayer films were evaluated or determined by the above-described respective methods. The results are shown in Table 4.

TABLE 4

| Item (unit) | Ex. 1 | Ex. 2 | Ex. 3 | Ex. 4 | Ex. 5 |
| --- | --- | --- | --- | --- | --- |
| Shrink in hot water (%) MD/TD temperature: 90° C. | 26/24 | 25/26 | 27/26 | 26/27 | 28/29 |
| Dry-heat shrink (%) MD/TD temperature: 120° C. | 23/22 | 22/23 | 23/22 | 24/25 | 26/25 |
| Haze value (%) | 3 | 3 | 4 | 4 | 4 |
| Tensile strength at break (MPa) MD/TD | 140/145 | 150/160 | 155/175 | 170/187 | 175/170 |
| Tensile elongation at break (%) MD/TD | 175/165 | 172/165 | 174/163 | 178/165 | 175/168 |
| Impact fracture energy (J) Front/back temperature: 5° C. | 2.2/2.0 | 2.0/2.2 | 2.0/1.8 | 2.2/2.5 | 2.0/2.3 |
| Oxygen transmission rate ($cm^3/m^2 \cdot day \cdot atm$) Temperature: 23° C., RH: 80% | 28 | 27 | 27 | 25 | 24 |
| Water vapor transmission rate ($g/m^2 \cdot day$) Temperature: 40° C., RH: 90% | 23 | 24 | 23 | 22 | 22 |

As apparent from the results shown in Table 4, it has been confirmed that the heat shrinkable multilayer films (Examples 1 to 5) according to the present invention highly satisfy various properties such as heat shrinkability, strength, moldability, gas barrier properties, water vapor barrier property and optical property.

<Evaluation of Suitability for Pouch Packaging (Including Suitability for Processed Meat Packaging and Suitability for Boiling) and Bag-Forming Ability>

(i) Production of Sample for Evaluation

Example 6 and Comparative Examples 4 and 5

Heat-treated tubular films 3f (heat shrinkable multilayer films) were obtained in the same manner as in Example 1 except that the conditions for production of films were respectively changed as described in Table 3. The thicknesses of the resultant heat shrinkable multilayer films were respectively 39 μm (Example 6), 40 μm (Comparative Example 4) and 39 μm (Comparative Example 5). The shrink in hot water, haze value, tensile strength at break, tensile elongation at break, impact fracture energy, oxygen transmission rate and water vapor transmission rate of each of the resultant heat shrinkable multilayer films were evaluated or determined by the above-described respective methods. The results are shown in Table 5.

(ii) Evaluation Methods
(a) Suitability for Pouch Packaging

Each of the resultant heat shrinkable multilayer films was two-side-sealed in a direction parallel to a direction perpendicular to a machine direction of the film by a heat sealing method, and one pinched portion was cut off to form a bag having a length (a length in a direction perpendicular to the machine direction of the film) of 350 mm and a width (a length in the machine direction of the film) of 150 mm. A ham in the form of a rectangular parallelepiped was used as contents to conduct vacuum packaging of the ham with an allowance rate of 15% (the circumference of the saclike packaging film is 110% relative to the circumference of the contents). The resultant package was then subjected to heat sterilization for 10 minutes in a hot water bath at 90° C. to make evaluation according to the following standard.

A: The shape of ham after heat sterilization was substantially not changed, the film was sufficiently tight-fitted, and the package had beautiful appearance. Fracture of the bag after boiling was not observed.
B: Some change was observed at corners of the ham after heat sterilization, and its commercial value was lowered.
C: The film was not sufficiently tight-fitted due to its insufficient shrinkage, and some wrinkles were observed in the packaging film.

(b) Bag-Forming Ability

Each of the resultant heat shrinkable multilayer films was three-side-sealed using a three-side sealing bag forming machine to form a bag. The appearance of the sealed portions was visually observed, and sealing strength was determined to make evaluation according to the following standard.

A: The sealing strength was 2 kg/15 mm of width or higher, and the sealed portions had beautiful appearance.
C: The sealed portions were shrunken, and crinkles were observed at the sealed portions.

(iii) Evaluation Results

The heat shrinkable multilayer films obtained in Example 6 and Comparative Examples 4 and 5 were evaluated as to suitability for pouch packaging and bag-forming ability by the above-described respective methods. The results are shown in Table 5.

TABLE 5

| Item (unit) | Ex. 6 | Comp. Ex. 4 | Comp. Ex. 5 |
| --- | --- | --- | --- |
| Shrink in hot water (%) MD/TD temperature: 90° C. | 34/39 | 1/2 | 43/47 |
| Haze value (%) | 4 | 9 | 5 |
| Tensile strength at break (MPa) MD/TD | 162/180 | 180/160 | 160/170 |
| Tensile elongation at break (%) MD/TD | 185/160 | 420/390 | 150/140 |
| Impact fracture energy (J) Front/back temperature: 5° C. | 2.1/2.3 | 1.0/1.1 | 1.5/1.5 |
| Oxygen transmission rate (cm$^3$/m$^2$ · day · atm) Temperature: 23° C., RH: 80% | 17 | 25 | 16 |
| Water vapor transmission rate (g/m$^2$ · day) Temperature: 40° C., RH: 90% | 21 | 35 | 20 |
| Suitability for pouch packaging | A | C | B |
| Bag-forming ability | A | A | C |

As apparent from the results shown in Table 5, in the package using the heat shrinkable multilayer film (Example 6) of the present invention, the shape of the ham after heat sterilization was not changed, the film was sufficiently tight-fitted, and the appearance was beautiful. On the other hand, in the package using the heat shrinkable multilayer film obtained in Comparative Example 4, the film was not sufficiently tight-fitted due to its insufficient shrinkage, and some wrinkles were observed in the packaging film. When the heat shrinkable multilayer film obtained in Comparative Example 5 was used, some change was observed at corners of the ham after heat sterilization. In addition, the sealed portions were shrunken, and crinkles were caused on the sealed line side, and the appearance of the resultant pouch was poor. Accordingly, it has been confirmed that the heat shrinkable multilayer film of the present invention has excellent suitability for pouch packaging.

<Evaluation of Suitability for Bag Packaging (Including Suitability for Raw Meat Packaging)>
(i) Production of Sample for Evaluation Example 7 and Comparative Example 6

Heat-treated tubular films 3f (heat shrinkable multilayer films) were obtained in the same manner as in Example 1 except that the conditions for production of films were respectively changed as described in Table 3. The thicknesses of the resultant heat shrinkable multilayer films were respectively 39 μm (Example 7) and 40 μm (Comparative Example 6).

(ii) Evaluation Method

One end of a film sample obtained by cutting each of the resultant heat shrinkable multilayer films into a folding width of 256 mm or 362 mm and a length of 700 mm was circular bottom-sealed to form a bag, and the bag was filled with about 5 to 7 kg of hamstring meat and was shrunken in hot water for 1 second at 83 to 85° C. With respect to the resultant package, the sufficiency (i.e., whether a space causing a puddle of meat juice is present or not) of shrinkage of the ear portions (upper and lower edge portions) of the package and the tightness of the package in the filled part were visually observed to make evaluation according to the following standard.

A: The shrinkage of the ear portions was sufficient, and the tightness of the package was good.
B: The shrinkage of the ear portions was slightly insufficient, and the tightness of the package was slightly poor.
C: The shrinkage of the ear portions was insufficient, and the tightness of the package was insufficient.

(iii) Evaluation Results

With respect to the heat shrinkable multilayer films obtained in Example 7 and Comparative Example 6, the suitability for bag packaging of the heat shrinkable multilayer films was evaluated by the above-described method. In the package using the heat shrinkable multilayer film (Example 7) of the present invention, the shrinkage of the ear portions (excessive edge portions or excessive films sealed ends) was sufficient, the tightness of the package was sufficient, and the appearance thereof was good (evaluation: A). On the other hand, in the package using the heat shrinkable multilayer film obtained in Comparative Example 6, the shrinkage of the ear portions was insufficient, and the tightness of the package was lacked (evaluation: C). Therefore, it has been confirmed that the heat shrinkable multilayer film of the present invention has excellent suitability for bag packaging.

<Evaluation of Suitability for Pillow Packaging>

(i) Production of Sample for Evaluation

Example 8

A heat-treated tubular film 3f (heat shrinkable multilayer film) was obtained in the same manner as in Example 1 except that the conditions for production of films were respectively changed as described in Table 3. The thickness of the resultant heat shrinkable multilayer film was 39 μm (Example 8).

(ii) Evaluation Method

Both ear portions (pinch lines) of the resultant heat shrinkable multilayer film were slit to provide a flat film sample having a width of 320 mm. A semi-circular polystyrene tray (dimensions having a rectangular part of a width of 25 mm (×190 mm) adjoining the diameter of a semi-circle part of a diameter of 190 mm) was pillow-packaged with the film sample at a speed of 35 shots/min by a CEP3000 model pillow packaging machine manufactured by Ibaraki Seiki Co., Ltd. in such a manner that the sample had a circumferential length of 290 mm and a cut length of 220 mm. The resultant package was brown with air at 170° C. for 5 seconds by a shrinkage tunnel manufactured by K&U System Co. to shrink the film. The appearance of the package was visually observed to make evaluation according to the following standard.

A: It was difficult to observe an excessive part (dog ear) of the film from the circular arc portion of the tray when the semi-circular tray was viewed from directly above, and the appearance was beautiful.

C: Many excessive parts (dog ears) of the film remained in the circular arc portion of the tray when the semi-circular tray was viewed from directly above, and the quality of commodities was poor.

(iii) Evaluation Results

With respect to the heat shrinkable multilayer film obtained in Example 8, the suitability for pillow packaging of the heat shrinkable multilayer film was evaluated by the above-described method. In the package using the heat shrinkable multilayer film (Example 8) of the present invention, it was difficult to observe the excessive part (dog ear) of the film from the circular arc part of the tray when the semi-circular tray was viewed from directly above, no deformation of the tray was observed, and the package had beautiful appearance (evaluation: A). Therefore, it was confirmed that the heat shrinkable multilayer film of the present invention has excellent suitability for pillow packaging.

<Evaluation of Suitability for Cooking of Sausage Filled and Hung and High-Temperature Creep Resistance>

(i) Production of Sample for Evaluation

Example 9 and Comparative Example 7

Heat-treated tubular films 3f (heat shrinkable multilayer films) were obtained in the same manner as in Example 1 except that the conditions for production of films were respectively changed as described in Table 3. The thicknesses of the resultant heat shrinkable multilayer films were respectively 40 μm (Example 9) and 40 μm (Comparative Example 7). The shrink in hot water, haze value, impact fracture energy, oxygen transmission rate and water vapor transmission rate of each of the resultant heat shrinkable multilayer films were evaluated or determined by the above-described respective methods. The results are shown in Table 6.

(ii) Evaluation Method (a) High-Temperature Creep Resistance

A film sample was cut to width×length=20 mm×200 mm, a scale of a 50 mm in length was placed around a center in a longitudinal direction, the cut film sample was marked with a felt tip pen in a transverse direction, and a thickness was measured to calculate a sectional area. Both ends of this sample in the longitudinal direction were clipped, and a weight (load) was attached to and hung from one end of the sample so as to apply stress of 1 kg/mm² thereto. The film sample thus fixed was immersed for 10 seconds in a heating bath at 90° C. Thereafter, the film sample was taken out of the bath and immediately cooled with water at ordinary temperature, water on the film sample was wiped off, and a distance between the marks applied by the felt tip pen was measured by a scale. With respect to each film sample cut off in a machine direction (MD) and a transverse direction (TD), a distance between the marks applied by the felt tip was measured 5 times, and average values thereof were calculated to regard the average values as lengths between the marks applied by the felt tip pen. The distortion rates in the machine and transverse directions were calculated from the resultant lengths between the marks applied with the felt tip pen using the following equation (2):

$$\text{Distortion rate (\%)} = [(L_0 - L_1)/L_0] \times 100 \quad (2)$$

$L_0$: Length between the marks applied with the felt tip pen prior to immersion, and $L_1$: Length between the marks applied with the felt tip pen after immersion.

A smaller value of the distortion rate in each of the machine and transverse directions indicates that such a film is farther excellent in the high-temperature creep resistance.

(b) Suitability for Cooking of Sausage Filled and Hung

One end of a casing of a 80 mm in folding width was closed with an aluminum clip, meat sausage (about 2.5 kg) was filled into the casing, an over-fill rate was controlled to 10% (measured at a body circumference), and the other end was closed with an aluminum clip to obtain a package sample. The package sample was hung and boil-cooked at 80° C. for 2 hours in a chamber, then cooled with water at ordinary temperature and subsequently cooled in a refrigerator at 5° C. for a day to measure weights and lengths before and after the hang-cooking and a body circumference after the hang-cooking (n=3). Rates of change in weight, change in length and distortion of body circumference were calculated from the resultant measured values using the following equations (3) to (5):

$$\text{Rate of change in weight (\%)} = [(W_0 - W_1)/W_1] \times 100 \quad (3),$$

$W_0$: Weight of package sample before hang-cooking, $W_1$: Weight of package sample after hang-cooking, $$\text{Rate of change in length (\%)} = [(L'_1 - L'_0)/L'_0] \times 100 \quad (4),$$

$L'_0$: Length of package sample before hang-cooking, $L'_1$: Length of package sample after hang-cooking, $$\text{Ratio of distortion of body circumference (\%)} = [(L''_1 - L''_0)/L''_1] \times 100 \quad (5),$$

$L''_0$: Body circumference 5 cm below the upper side clip along the package sample upon hanging, and $L''_1$: Body circumference 5 cm above the lower side clip along the package sample upon hanging.

The larger ratio of distortion of the body circumference indicates that the degree of a bulge in the lower portion of the sample is larger. The appearance of the package sample after cooled at a temperature of 5° C. for a day was visually observed to make evaluation according to the following standard.
A: No wrinkle was observed.
B: Some wrinkles were observed in the shoulder or body.
C: Wrinkles were observed in the shoulder and body.
(iii) Evaluation Results
With respect to the heat shrinkable multilayer films obtained in Example 9 and Comparative Example 7, the high-temperature creep resistance and suitability for cooking of sausage filled and hung of the heat shrinkable multilayer films were evaluated by the above-described respective methods. The results are shown in Table 6.

TABLE 6

| Item (unit) | Example 9 | Comp. Ex. 7 |
|---|---|---|
| Shrink in hot water (%) MD/TD temperature: 90° C. | 15/16 | 16/17 |
| Haze value (%) | 6 | 5 |
| Impact fracture energy (J) Front/back temperature: 5° C. | 2.8/2.6 | 2.7/2.5 |
| High-temperature creep resistance (%) Ratio of distortion MD/TD | 18/15 | 32/21 |
| Oxygen transmission rate ($cm^3/m^2 \cdot day \cdot atm$) Temperature: 23° C., RH: 80% | 25 | 34 |
| Water vapor transmission rate ($g/m^2 \cdot day$) Temperature: 40° C., RH: 90% | 23 | 28 |
| Suitability for cooking of sausage filled hung | | |
| Rate of change in weight (%) | 0 | 0 |
| Rate of change in length (%) | 2 | 3 |
| Rate of change in body circumference (%) | 6 | 11 |
| Evaluation on wrinkling | A-B | C |

As apparent from the results shown in Table 6, the heat shrinkable multilayer film (Example 9) of the present invention was excellent in high-temperature creep resistance as compared with the heat shrinkable multilayer film obtained in Comparative Example 7. Therefore, it has been confirmed that the heat shrinkable multilayer film of the present invention is excellent particularly in heat resistance and high-temperature creep resistance. In the package using the heat shrinkable multilayer film (Example 9) of the present invention, the values of rate in change of length and ratio of distortion of body circumference in the evaluation on the suitability for cooking of sausage filled and hung were small. Accordingly, it has been confirmed that the heat shrinkable multilayer film of the present invention has excellent suitability for cooking of sausage filled and hung.

<Evaluation of Suitability for Deep-Draw Forming (Including Suitability for Boiling)>
(i) Production of Sample for Evaluation Example 10 and Comparative Examples 8 and 9

Heat-treated tubular films 3f (heat shrinkable multilayer films) were obtained in the same manner as in Example 1 except that the conditions for production of films were respectively changed as described in Table 3. The thicknesses of the resultant heat shrinkable multilayer films were respectively 90 μm (Example 10) and 90 μm (Comparative Examples 8 and 9). The shrink in hot water, haze value, tensile strength at break, tensile elongation at break, impact fracture energy, oxygen transmission rate and water vapor transmission rate of each of the resultant heat shrinkable multilayer films were evaluated or determined by the above-described respective methods. The results are shown in Table 5.

(ii) Evaluation Methods
(a) Suitability for Deep-Draw Forming
A film sample was draw-formed at an area drawing ratio of 3 times by means of a deep-draw forming machine (FV603 Model) manufactured by Omori Co., Ltd. using a cylinder type of a drawing die 100 φ (draw forming temperature: 90° C.) to prepare a package sample. The condition of the package sample was visually observed to make evaluation according to the following standard.
A: Draw forming could be normally conducted.
B: A drawn form was shallower than the die.
C: Draw forming could not be conducted, or the film was broken.
(b) Suitability for Boiling of Deep-Draw Formed Product
A film sample was subjected to deep-draw forming (die: 113×167×60 mm) by means of a forming machine (R250) manufactured by Multivac Co., beef thigh meat (about 400 g) was filled therein and packaged under deaeration, and the packaging material was shrunken in water at 90° C. for 10 seconds to obtain a package sample. The package sample was visually observed to make evaluation according to the following standard.
A: The film was shrunken and tightly fitted, and the tightness of the package was good.
C: The shrinkage of the film was insufficient, and the tightness of the package was insufficient.
(iii) Evaluation Results
With respect to the heat shrinkable multilayer films obtained in Example 10 and Comparative Examples 8 and 9, suitability for deep-draw forming of each heat shrinkable multilayer film and suitability for boiling of each deep-draw formed article were evaluated by the above-described respective methods. The results are shown in Table 7.

TABLE 7

| Item (unit) | Example 10 | Comp. Ex. 8 | Comp. Ex. 9 |
|---|---|---|---|
| Shrink in hot water (%) MD/TD temperature: 90° C. | 7/12 | 42/47 | 1/2 |
| Haze value (%) | 8 | 7 | 15 |
| Tensile strength at break (MPa) MD/TD | 205/180 | 200/170 | 190/185 |
| Tensile elongation at break (%) MD/TD | 300/270 | 150/140 | 450/420 |
| Impact fracture energy (J) Front/back Temperature: 5° C. | 2.1/2.3 | 1.9/1.7 | 0.9/1.0 |
| High-temperature creep resistance (%) Ratio of distortion MD/TD | 22/18 | — | 68/48 |
| Oxygen transmission rate ($cm^3/m^2 \cdot day \cdot atm$) Temperature 23° C., RH: 80% | 8 | 7 | 12 |
| Water vapor transmission rate ($g/m^2 \cdot day$) Temperature: 40° C., RH: 90% | 8 | 8 | 12 |
| Suitability for deep-draw forming | A | C | A |
| Suitability for boiling of deep-draw formed article | A | — | C |

As apparent from the results shown in Table 7, normal deep-draw forming could be conducted in the heat shrinkable multilayer film (Example 10) of the present invention. On the other hand, in the heat shrinkable multilayer film obtained in Comparative Example 8, deep-draw forming could not be conducted because (relaxation) heat treatment was not carried out upon the production of the film. In the package using the heat shrinkable multilayer film (Example 10) of the present invention, the film was shrunk and tightly fitted, and tightness of the package was good. On the other hand, in the package using the heat shrinkable multilayer film obtained in Comparative Example 8, it was observed that the shrinkage of the film was insufficient, and the tightness was insufficient, and the contents (meat) were slightly moved. Accordingly, it has been confirmed that the heat shrinkable multilayer film of the present invention has excellent suitability for deep-draw forming.

<Evaluation of Suitability for Tray Lid Material>
(i) Production of Sample for Evaluation

Example 11

A heat-treated tubular film 3f (heat shrinkable multilayer film) was obtained in the same manner as in Example 1 except that the conditions for production of films were respectively changed as described in Table 3. The thickness of the resultant heat shrinkable multilayer film was 27 μm (Example 11). The shrink in hot water, dry-heat shrink, haze value, tensile strength at break, tensile elongation at break, impact fracture energy, oxygen transmission rate and water vapor transmission rate of the resultant heat shrinkable multilayer film were evaluated or determined by the above-described respective methods. The results are shown in Table 8.

(ii) Evaluation Method

One ear portion (pinch line) of the resultant heat shrinkable multilayer film was cut open to provide a flat film sample having a width of 840 mm. Lid forming was carried out by means of PERFORMED TRAY MACHINEINPACKNEM A4 manufactured by ROSS Inc. by using the film sample as a lid material, using a tray (dimensions: length 225 mm×width 155 mm×height 40 mm) having a layer structure of polyethylene/adhesive resin/saponified product of ethylene-vinyl acetate copolymer/adhesive resin/expanded polystyrene (the thicknesses of respective layers are 20 μm/7 μm/300 μm) and using 200 g of ground meat as contents in such a manner that the polyethylene side of the tray faces the inside resin of the film sample. The sealing temperature upon forming was set to 110° C., and the number of shots was set to 20 packs/min. The package thus obtained was stored in a refrigerator for a day, and the appearance thereof was evaluated according to the following standard.

A: Neither looseness of the film for lid material nor distortion of the tray was observed after stored for a day in the refrigerator, and the package had beautiful appearance.

C: The tray was distorted though the looseness of the film for lid material was observed after stored for a day in the refrigerator, and so the commodity value was lowered.

(iii) Evaluation Results

With respect to the heat shrinkable multilayer film obtained in Example 11, suitability for tray lid material of the heat shrinkable multilayer film was evaluated by the method described above. The results are shown in Table 8.

TABLE 8

| Item (unit) | Example 11 |
| --- | --- |
| Shrink in hot water (%) MD/TD temperature: 90° C. | 28/29 |
| Dry heat shrink (%) MD/TD Temperature: 120° C. | 25/26 |
| Haze value (%) | 3 |
| Tensile strength at break (MPa) MD/TD | 136/160 |
| Tensile elongation at break (%) MD/TD | 148/127 |
| Impact fracture energy (J) Front/back Temperature: 5° C. | 1.9/2.0 |
| Oxygen transmission rate (cm$^3$/m$^2$ · day atm) Temperature: 23° C., RH: 80% | 26 |
| Water vapor transmission rate (g/m$^2$ · day) Temperature: 40° C., RH: 90% | 33 |
| Suitability for tray lid material | A |

As apparent from the results shown in Table 8, in the package using the heat shrinkable multilayer film (Example 11) of the present invention, neither looseness of the film for lid material nor distortion of the tray was observed after stored for a day, and the package had beautiful appearance. Accordingly, it has been confirmed that the heat shrinkable multilayer film of the present invention has excellent suitability for tray lid material.

INDUSTRIAL APPLICABILITY

As described above, according to the present invention, there can be provides a heat shrinkable multilayer film that can highly satisfy various properties such as heat shrinkability, strength, heat resistance, high-temperature creep resistance, moldability, suitability for various packages, gas barrier properties, water vapor barrier property and optical property, and is excellent in heat resistance and high-temperature creep resistance in particular.

Therefore, the heat shrinkable multilayer films according to the present invention can be used as packaging materials for pouch, packaging materials for bag, packaging materials for pillow packaging, packaging materials for deep-draw packaging and lid materials for tray packaging.

The invention claimed is:

1. A heat shrinkable multilayer film comprising an outer surface layer (a) formed of a thermoplastic resin, a first intermediate layer (b1) formed of a polyamide resin, a second intermediate layer (b2) formed of a saponified product of an ethylene-vinyl acetate copolymer, and an inner surface layer (c) formed of a polyolefin resin, wherein the shrink of the heat shrinkable multilayer film in water at 90° C. is within a range of from 3 to 45% in each of machine and transverse directions, the polyamide resin is a mixture of 60 to 90% by weight of an aliphatic polyamide having a melting point of 210° C. or higher and 10 to 40% by weight of an aromatic polyamide comprising isophthalic acid and terephthalic acid as acid components, and the multilayer film is obtained by stretching a multilayer film comprising the outer surface layer (a), the first intermediate layer (b1), the second intermediate layer (b2) and the inner surface layer (c) at a draw ratio of from 2.5 to 4 times in each of machine and transverse directions and then subjecting the stretched film to a heat relaxation treatment so as to give a relaxation ratio of from 2 to 40%.

2. The heat shrinkable multilayer film according to claim 1, which is small in ratio of distortion in each of machine and transverse directions when immersed for 10 seconds in water at 90° C. while applying stress of 1 kg/mm$^2$, and is excellent in high-temperature creep resistance.

3. The heat shrinkable multilayer film according to claim 1, wherein the aliphatic polyamide is at least one polymer selected from the group consisting of nylon 6 and nylon 66.

4. The heat shrinkable multilayer film according to claim 1, wherein the saponified product of the ethylene-vinyl acetate copolymer has an ethylene content ranging from 25 to 48 mol % and a saponification degree of 98% or higher.

5. The heat shrinkable multilayer film according to claim 1, wherein the polyolefin resin is at least one polymer selected from the group consisting of homopolymers of ethylene, homopolymers of propylene and linear copolymers of α-olefins having 2 to 8 carbon atoms.

6. The heat shrinkable multilayer film according to claim 1, wherein the thermoplastic resin is a polyester resin.

7. A packaging material for pouch, comprising the heat shrinkable multilayer film according to claim 1.

8. A packaging material for bag, comprising the heat shrinkable multilayer film according to claim 1.

9. A packaging material for pillow packaging, comprising the heat shrinkable multilayer film according to claim 1.

10. A packaging material for deep-draw forming, comprising the heat shrinkable multilayer film according to claim 1.

11. A lid material for tray packaging, comprising the heat shrinkable multilayer film according to claim 1.

* * * * *